Oct. 16, 1962   H. J. STEELE   3,058,785
GAS LUBRICATED BEARINGS
Filed Sept. 14, 1960

Inventor
H. J. Steele
By Elscott Downing Peebles
Attys

United States Patent Office 3,058,785
Patented Oct. 16, 1962

3,058,785
GAS LUBRICATED BEARINGS
Henry Jack Steele, Moseley, Birmingham, England, assignor to Joseph Lucas (Industries) Limited, Birmingham, England
Filed Sept. 14, 1960, Ser. No. 55,925
Claims priority, application Great Britain Sept. 21, 1959
1 Claim. (Cl. 308—9)

This invention relates to air or other gas lubricated bearings for use with shafts which are intended to rotate at very high speeds, such, for example, as 200,000 revolutions per minute. Gas lubricated bearings may be of two kinds. One such kind known as a pressurised bearing requires to be supplied with gas under pressure in operation, whilst the other kind, known as a hydrodynamic bearing, requires no supply of gas under pressure in operation, but may require a supply of such gas under pressure during starting.

Gas lubricated bearings operating at high speeds are susceptible to an instability known as "half-speed whirl," so called because at critical speeds the geometric axis of the shaft describes an orbital motion about the axis of the bearing at approximately half the speed of rotation of the shaft. In order to minimise this tendency, and also to minimise the quantity of gas which requires to be supplied in the case of a pressurised bearing, it is advantageous for the clearances to be as small as possible. However, small clearances result in difficulties in starting.

With a view to meeting these opposed requirements, a gas lubricated bearing according to the invention has a hollow shaft with a wall thickness which is so chosen in relation to the diameter of the shaft and the material from which it is made, that when the shaft is static there is sufficient clearance to allow the shaft to start rotating freely, and the clearance is reduced with increasing angular velocity owing to the radial expansion of the shaft due to centrifugal forces so that half-speed whirl will not develop at angular velocities for which the bearing is designed.

More particularly, the wall thickness, diameter and material of the shaft are chosen to conform with the Equation "A" hereinafter defined.

Figure 1:
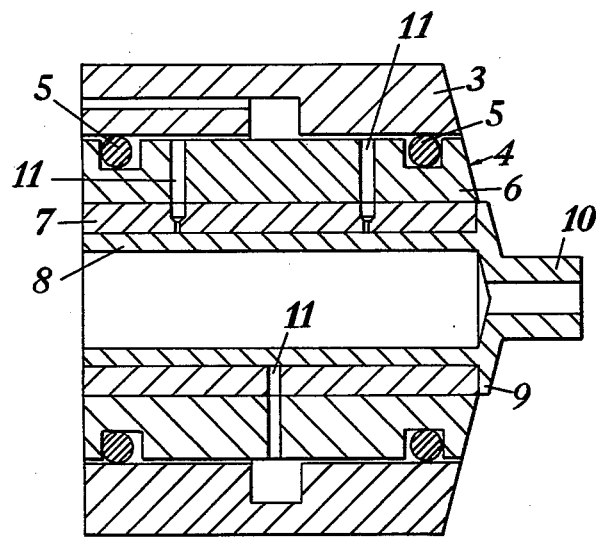
Figure 2:
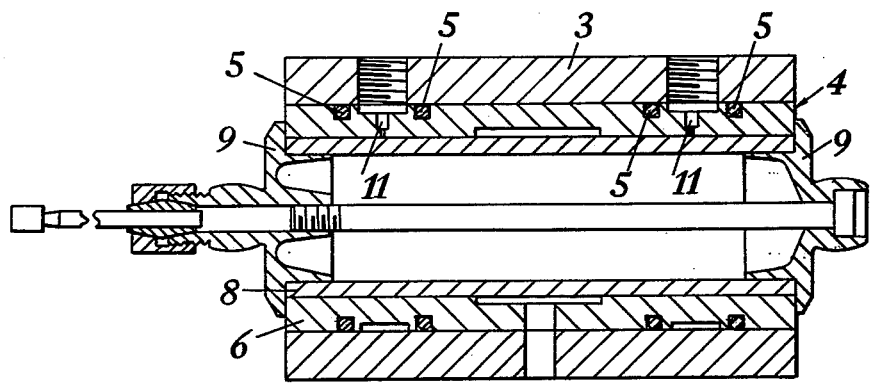

In the accompanying drawings FIGURES 1 and 2 respectively are sectional side views illustrating two examples of the invention as applied to a pressurised bearing.

Referring first to FIGURE 1 of the drawings, there is provided a cylindrical housing 3 having a bearing sleeve 4 resiliently mounted therein by means of a pair of annular sealing rings 5. Conveniently the bearing sleeve consists of a mild steel hollow cylinder 6 having secured to its inner face a hollow bush 7 formed from bronze.

Within the sleeve 4 is a hollow shaft 8 the wall thickness of which is so chosen in relation to its diameter and to the material from which it is made that when the shaft is static there is sufficient clearance to allow it to start rotating freely, but when the angular velocity of the shaft increases to the value for which the shaft is designed, the clearance is reduced by centrifugal forces acting on the shaft to a sufficiently small size to prevent the development of half-speed whirl.

At one end the shaft 8 is provided with an integral flange 9 which bears against the bush 7 to accept any axial thrusts on the bearing. Moreover, the shaft is extended beyond the flange to define a portion 10 of reduced diameter through the intermediary of which the shaft may be rotated. Further, lubrication of the bearing is effected by supplying gas under pressure through the housing 3 into the annular space between the latter and the cylinder 6 and thence by way of a number of radial passages 11 to the clearance between the bush 7 and the shaft 8.

The invention is equally applicable to hydrodynamic bearings, and for both types of bearings it is possible to determine an equation relating the wall thickness, diameter and material of the shaft in terms of the angular velocity for which the shaft is to be designed and the required radial extension. If these latter quantities are designated W and U respectively, then $$U = \frac{r_2^3}{4gE}\varphi W^2(3+\sigma)\left[\left(\frac{r_1}{r_2}\right)^2 + \frac{1-\sigma}{3+\sigma}\right]$$

where $r_1$, $r_2$ are the inner and outer radii of the shafts respectively, $\sigma$, $E$, $\varphi$ are respectively Poisson's ratio, Young's modulus and the density of the material of the shaft, and $g$ is the acceleration due to gravity. Re-writing the radii $r$ as diameters $d$ and substituting $$C = \frac{1-\sigma}{3+\sigma} \text{ and } K = \varphi\frac{W^2(3+\sigma)}{32gE}$$

we obtain $$U = Kd_2^3\left[\left(\frac{d_1}{d_2}\right)^2 + c\right]$$

But $d_2 - d_1 = 2t$ where $t$ is the shaft wall thickness $$\therefore d_1 = d_2 - 2t$$

and $$U = Kd_2^3\left[\left(1 - \frac{2t}{d_2}\right)^2 + c\right]$$

or $$\frac{U}{K} = d_2^3(1+c) - 4td_2^2 + 4t^2d_2$$

Resubstituting for $K$ and writing $$\frac{1}{3+\sigma} = X$$

a constant (so that $(1+c) = 4X$) we have $$\frac{8UgEX}{\varphi w^2} = d_2^3X - td_2^2 + t^2d_2 \quad \text{"A"}$$

By employing this expression the necessary diameter-thickness ratio can be deduced.

The example illustrated in FIGURE 2 of the drawings is similar to that shown in FIGURE 1, and like parts have been designated with similar reference numerals. In this example a one piece sleeve 4 is employed, and the shaft 8 is provided with a flange 9 at each end. However, the flanges 9 are formed separately from the shaft 8 and the materials from which the shaft and flanges are made are chosen so that the radial extension at the extremities of the compound shaft is greater than that of the central portion. In an example the shaft 8 and flanges 9 are formed from steel and brass respectively.

It has been found that by the present invention not only is half-speed whirl obviated, but in the case of pressurised bearings gas consumption at high speeds is considerably reduced.

Having thus described my invention what I claim as new and desire to secure by Letters Patent is:

A gas lubricated bearing comprising in combination a bearing housing, a cylindrical bore extending longitudinally through said housing, a hollow shaft mounted for rotation within said bore, an inlet in said housing adapted for connection to a source of gas under pressure, and passage means in the housing connecting said inlet with said bore, the thickness/diameter ratio of the shaft being chosen to conform with the equation:

$$\frac{8UgEX}{\varphi W^2} = d_2^3 - td_2^2 + t^2d_2$$

where $g$ is the acceleration due to gravity, $X$ has the value $$\frac{1}{3+\sigma}$$

$\sigma$, $E$ and $\varphi$ are Poisson's ratio, Young's modulus and the density of the material of the shaft respectively, $d_2$ and $t$ respectively are the external diameter and thickness of the shaft when static, $W$ is the angular velocity for which the shaft is designed, and $U$ is the radial extension of the shaft at the angular velocity $W$, the value of $U$ being chosen so that at the angular velocity $W$ the shaft substantially fills said bore so that half-speed whirl is prevented, but when the shaft is static it has sufficient clearance to allow it to start rotating freely.

References Cited in the file of this patent

FOREIGN PATENTS 729,294    Great Britain _____ May 4, 1955